INVENTORS M. DIXON
A. J. KURTZIG
BY
ATTORNEY

United States Patent Office 3,759,745
Patented Sept. 18, 1973

3,759,745

HYDROGEN ANNEALING OF SUBSTITUTED MAGNETIC GARNETS AND MATERIALS SO PRODUCED

Melvyn Dixon, Allentown, Pa., and Arjeh Jehuda Kurtzig, Short Hills, N.J., assignors to Bell Telephone Laboratories, Incorporated, Murray Hill, N.J.

Filed July 14, 1971, Ser. No. 162,517
Int. Cl. H01f *10/02*
U.S. Cl. 117—237 7 Claims

ABSTRACT OF THE DISCLOSURE

Magnetization values for a variety of magnetic garnets containing partial nonmagnetic substitutional ions replacing iron are altered by annealing in hydrogen-containing atmospheres. Such changes which may be brought about in periods as short as five minutes or less at temperatures of the order of from 500° C. to 800° C. result from the temperature dependence of site preference of such nonmagnetic substitutional ions. Such changes may accomplish a "tailoring" of the garnet material for use in magnetic switches and memories.

BACKGROUND OF THE INVENTION

(1) Field of the invention

The invention is concerned with the modification of magnetic properties of garnet compositions in which iron is partially replaced by any of a variety of generally nonmagnetic ions. Such materials are currently of interest for use in a variety of magnetic switching and memory devices. One such class of devices which may utilize a thin sheet or epitaxial layer of garnet materials involves the nucleation and propagation of magnetic domains evidencing a magnetic polarization opposite to that of the surrounding region of the material.

(2) Description of the prior art

There is considerable interest in the use of magnetic compositions of the garnet structure in a variety of magnetic devices. One such class of devices which has captured the interest of many workers, sometimes designated "bubble" devices, may operate as switches or memories and may also perform a variety of logic functions. Such devices utilize thin sheets or films of magnetic material which evidence an easy direction of magnetization in a direction normal to a major surface to permit propagation of domains with polarization substantially normal to such surface. Devices of this class have now been developed to a high degree of sophistication; they may take a number of forms which may or may not involve magnetic overlay circuitry, readout ciricuitry, biasing fields, strip or other shape domains, etc. From a memory standpoint, particular interest results from the demonstrated capability of providing a bit density equal to or exceeding $10^6$ bits per square centimeter of surface area. Vol. MAG-5 IEEE Trans. on Magnetics, No. 3, page 566, September 1969 describes some of the early work. Scientific American, June 1971, pages 78–90, describes some recent developments.

To a profound extent, present advances in bubble technology, as well as in other magnetic devices, are intimately related to advances in materials technology. Many workers, for example, consider that from a commercial standpoint, bubble devices assumed significance only with the discovery of the possibility of inducing unique anisotropy into the garnet system traditionally believed to be cubic (i.e., lacking in a unique easy direction of magnetization). This discovery was followed in rapid succession with a number of other developments which have to date culminated in the capability of fabricating magnetic garnet epitaxial films on nonmagnetic garnet substrates with a defect concentration sufficiently low to permit desired packing densities.

Despite these remarkable advances, it is recognized by most workers that there are still obstacles to be overcome before quantity manufacture becomes feasible. Particularly for the order of packing densities contemplated, requirements on reproducibility with respect, inter alia, to magnetic properties are on a level which has been approached on only one or two attempts previously (allusion is made to transistor and laser technologies).

Operating parameters for magnetic devices, such as bubble devices, may require tolerances as small as ±1% or smaller, for example, in magnetization. This parameter is significant in determining the magnitude of the required biasing field and also enters into determination of bubble size. Bubble size must correspond to the bit density designed into the device by any superimposed read, write, or propagating circuitry.

Maintenance of magnetization within such close tolerances is fairly simple to accomplish in orthoferrites or other magnetic materials in which there is no critical dilution of the iron sublattices. It becomes a significant problem in the garnet system in which magnetization is critically dependent on precise control both of the degree of iron dilution and also on the site preference of any such dilutent as between the two iron sites. It is apparent that close control of magnetization minimizes or avoids the need to tailor design of ancillary circuitry to match the magnetic properties of each sample or in the alternative minimizes the rejection rate for otherwise suitable garnet samples.

SUMMARY OF THE INVENTION

In accordance with the invention, the magnetization of garnet samples, either bulk or epitaxial, may be adjusted within very close limits by a simple annealing procedure subsequent to growth. This procedure, which is applicable to garnets in which iron ions have been partially replaced by any of a number of nonmagnetic or less magnetic ions such as, for example, gallium, aluminum and scandium, etc., involves a short-term heating within the range of 500° C. to 800° C. for periods which may be as short as five minutes. These unusually short periods are attributed to a hydrogen content in the atmosphere which, for the purposes of the invention, must be at a level of at least 1%, or preferably, 5% by volume.

DETAILED DESCRIPTION

(1) The figures

It has been indicated that the inventive procedures are applicable to films of the type described as utilized in a variety of devices. All such devices depend on a strong growth-induced crystalline anisotropy resulting in an easy direction normal to the plane of the film and most depend upon the creation and/or movement of magnetic domains of a magnetization direction opposite to that of the surrounding region. Domain patterns in many such devices are essentially cylindrical although some may assume strip or other shape configurations. The following description is considered exemplary.

Figure 1:
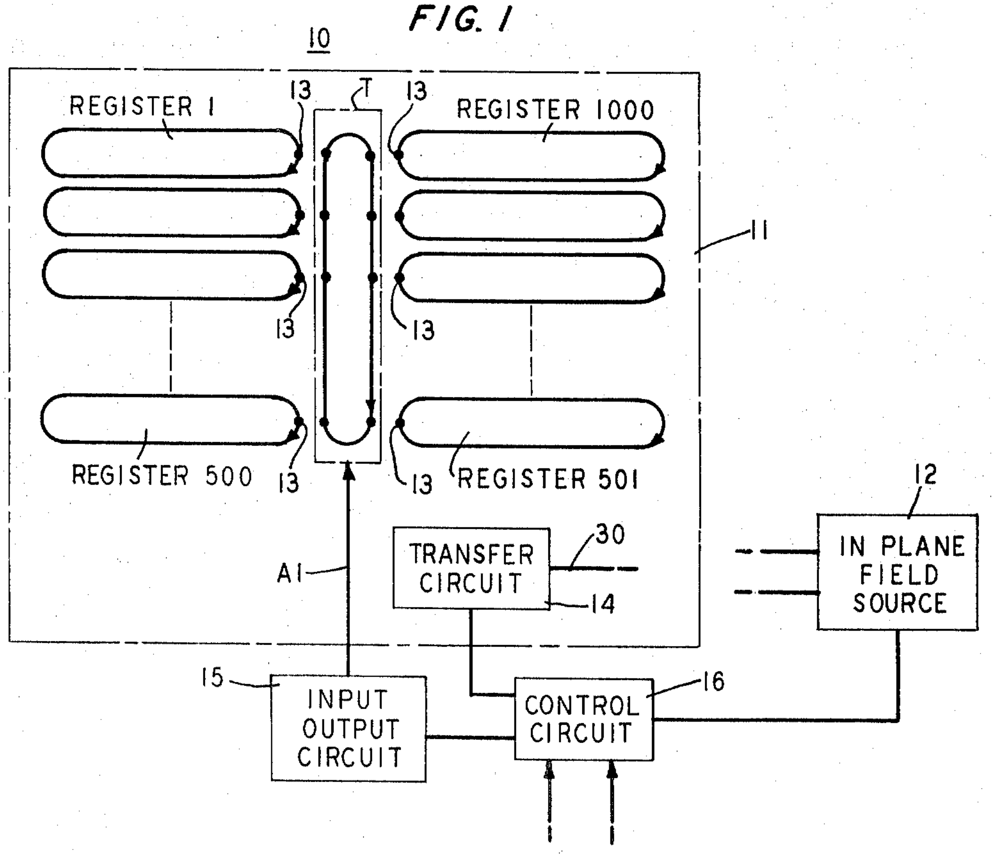
FIG. 1 is a schematic diagram of a recirculating memory utilizing an LPE grown garnet layer in accordance with the invention.
Figure 2:
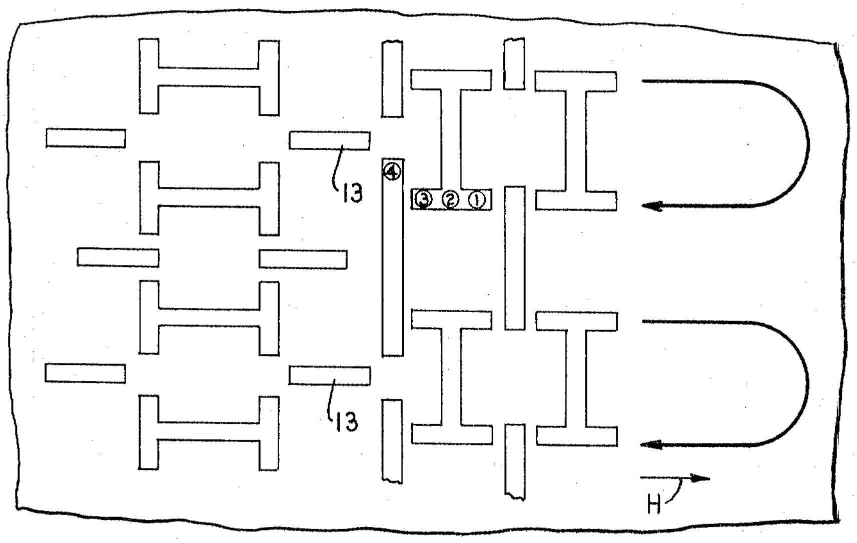
FIG. 2 is a detailed magnetic overlay and wiring configuration for portions of the memory of FIG. 1, showing domain locations during operation.

The device of FIGS. 1 and 2 is illustrative of the class of "bubble" devices described in IEEE Transactions on Magnetics, vol. Mag-5 No. 3, September 1969, pp. 544–553 in which switching, memory and logic functions depend upon the nucleation and propagation of enclosed, generally (but not necessarily) cylindrically shaped, magnetic domains having a polarization opposite to that of the immediately surrounding area. Interest in such devices centers, in large part, on the very high packing density so afforded, and it is expected that commercial devices with from $10^5$ to $10^7$ bit positions per square inch will be commercially available. The device of FIGS. 1 and 2 represents a somewhat advanced stage of development of the bubble devices and include some details which have been utilized in recently operated devices.

FIG. 1 shows an arrangement 10 including a sheet or slice 11 of material in which single wall domains can be moved. The movement of domains in accordance with this invention is dictated by patterns of magnetically soft overlay material in response to reorienting in-plane fields. For purposes of description, the overlays are bar and T-shaped segments and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not hsown) driven in quadrature as is well understood. The overlay configuration is not shown in detail in FIG. 1. Rather, only closed "information loops," are shown in order to permit a simplified explanation of the basic organization iin accordance with this invention unencumbered by the details of the implementation. We will return to an explanation of the implenmentation hereinafter.

The figure shows a number of horizontal closed loops separated into right and left banks by a vertical closed loop as viewed. It is helpful to visualize information, i.e., domain patterns, circulating clockwise in each loop as an in-plane field rotates clockwise.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consucetive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated, that a binary word, so reresented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a one thousand bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the in-plane field synchronously with the clockwise movement of information in the parallel channels. A read or a write operation is responsive to signals under the control of control circuit 16 of FIG. 1 and is discussed in some detail below.

The termination of either a write or a read operation simliarly terminates in the transfer of a pattern of domains to the horizontal channel. Either operation necessitates the recirculation of information in the vertical loop to position 13 where a transfer operation moves the pattern from the vertical channel back into appropriate horizontal channels as described above. Once again, the information movement is always synchronized by the rotating field so that when transfer is carried out, appropriate vacancies are available in the horizontal channels at positions 13 of FIG. 1 to accept information. For simplicity, the movement of only a single domain, representing a binary one, from a horizontal channel into the vertical channel is illustrated. The operation for all the channels is the same as is the movement of the absence of a domain representing a binary zero. FIG. 2 shows a portion of an oevrlay pattern defining a representative horizontal channel in which a domain is moved. In particular, the location 13 at which domain transfer occurs is noted.

The overlay pattern can be seen to contain repetitive segments. When the filed is aligned with the long dimension of an overlay segment, it induces poles in the end portion of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2. 3, and 4 in FIG. 2, those positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns repersenting consecutive binary words, accordingly, move consecutively to positions 13.

The particular starting position of FIG. 2 was chosen to avoid a description of normal domain propagation in response to rotating in-plane fields. Instead, the consecutive positions from the right as viewed in FIG. 2, for a domain adjacent the vertical channel preparatory to a transfer operation are described. A domain in position 4 of FIG. 2 is ready to begin its transfer cycle.

Device characteristics of concern affected by the procedures of the invention are related in known manner to the measured value of the magnetic anisotropy (the field required to rotate the direction of magnetization from the unique easy axis to the medium axis of magnetization perpendicular to the easy axis). The relationship of device parameters to this value is set forth in section 3 under the Detailed Description.

Figure 3:
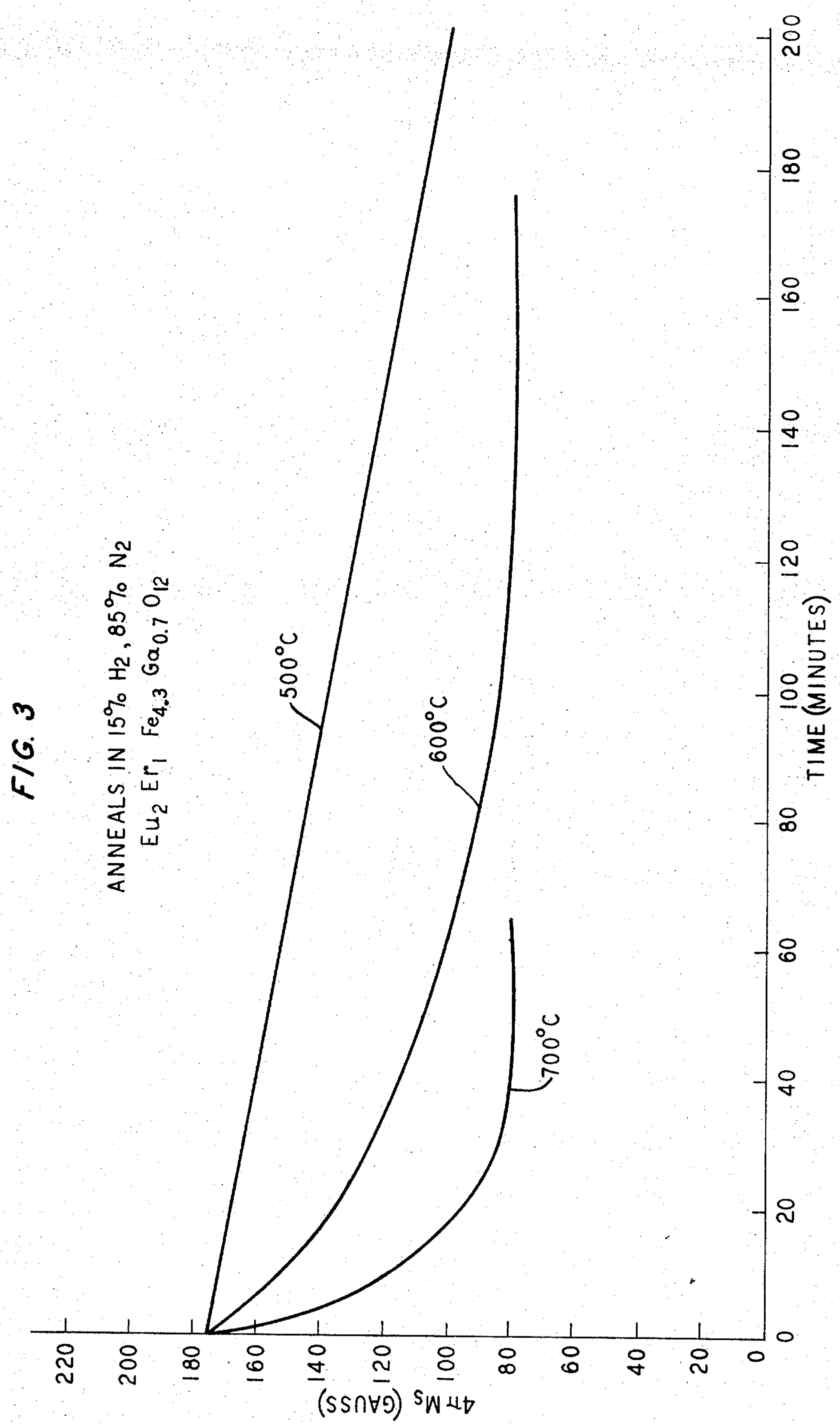
FIG. 3 on coordinates of magnetization $4\pi M_s$ in gauss and time in minutes is a plot showing the relationhip between those two parameters for an illustrative garnet composition annealed at different temperatures.

The data of FIG. 3 corresponds with a sample of the composition $Eu_2ErFe_{4.3}Ga_{0.7}O_{12}$ grown from a flux. Data taken on epitaxially grown samples are similar. The three temperatures were 500° C., 600° C., and 700° C. It is seen that initial magnetization was about 175 gauss, and that five minutes resulted in a reduction of this value to levels of 150, 165, and 170 gauss for temperatures of 500° C., 600° C., and 700° C., respectively. It is seen that the curve corresponding with the high temperature anneal (700° C.) levels off at a value of about 75 gauss after a period of about 40 minutes. The curves corresponding with the lower temperature anneals are not fully saturated within the period corresponding with the maximum abscissa value but will continue annealing with terminal values of about 65 and 55 gauss, respectively.

Consideration of the information available in section 2 of this detailed description reveals that the curve forms of FIG. 3, while typical for most garnet compositions of concern, are not representative of a second category. This second category, which generally involves relatively large substitutions for iron, is characterized by an increase in magnetization with annealing.

The invention has been discussed largely in terms of alteration in magnetization; such alteration may be carried out with a view to reproducibility from sample to sample or with a view to tailoring magnetization to specific requirements in a particular example. Further, while discussion largely contemplates uniform treatment of the entirety of a given sample, it may be desired to modify the magnetization in but a portion, or portions. In such instances portions may be masked by use of aluminum overlays which are substantially impervious to hydrogen.

An ancillary feature of the invention is concerned with the effect on the magnetic Néel temperature. The Néel temperature is, to a first approximation dependent on the number of iron ions per formula unit, regardless of their site distribution Néel temperature therefore decreases with decreasing iron. In a sense, the effect of the inventive procedure is to maximize the effect of the substitutional ion. Increasing the site preference for such substitutional ion permits attainment of a given changed magnetization with a smaller total substitution. Accordingly, materials of given magnetic moment processed in accordance with the invention generally evidence a Néel temperature somewhat higher than that of a conventionally processed material.

(2) The mechanism

The inventive procedure is dependent upon a redistribution of substantial ions as between the two crystallographic sites occupied by iron in the prototypical compound. It is well known that the net magnetic moment in YIG is 5 Bohr magnetons (corresponding with the contribution of one iron $3^{+}$ ion). This moment is ascribed to the difference between the oppositely polarized moments of the two octahedral iron ions on the one hand and the three tetrahedral iron ions on the other. Modification of magnetization in magnetic garnets generally takes the form of partial substitution of nonmagnetic ions for iron. Since, based on size and other considerations, such substitutional ions show a site preference which is more or less pronounced for one or the other of the iron sites, the effect of such substitution may be either to increase or to decrease net magnetic moment. In certain instances, noticeably for gallium substitution, which shows a preference for the predominant tetrahedral site, increasing the amount at first results in decreasing magnetization and finally results in increasing magnetization as the continued preference for the tetrahedral site results in a predominance of octahedral iron ions.

It is known that the degree of site preference for all substitutional ions which may partially replace iron is temperature-dependent. See, IEEE Transactions on Magnetics, Mag-3, No. 3, 509 (1967). In that reference it is also indicated that site preferences of diluent ions may be modified by long-term anneal. Accordingly, periods of the order of 6 hours were found to result in measurable change in magnetization for garnet samples of the composition $Y_5Fe_{4.23}Ga_{0.77}O_{12}$ heated at a temperature of 800° C.

The inventive procedure is considered to depend also on a redistribution of diluent ions as between the two iron sites. Accordingly, materials before processing evidence that site population representing the equilibrium distribution for growth temperature which may be in the range from 1300° C. to about 800° C. depending on composition and growth technique. The effect of processing in accordance with the invention is to shift the distribution always by enhancing preferential site population to values approaching the equilibrium distribution for the particular anneal temperature. Accordingly, magnetization may increase or decrease, depending upon the nature and amount of the ionic species. Consider, for example, a garnet containing gallium in an amount of up to about 1.2 per formula unit. The effect of annealing, since it increases site preference (and since gallium preferentially populates the tetrahedral site) is to reduce magnetization. The effect of annealing on samples containing larger amounts of gallium is to cause an increase in magnetization since enhancement of site preference results in an increasing predominance of octahedral iron ions. The effect of annealing is to some extent dependent both on composition and temperature.

Similar effects are observable in garnets in which iron has been partially replaced by aluminum, scandium, indium, silicon, germanium, vanadium, etc. See, Experimental Magnetochemistry by M. M. Schieber, 1967, p. 360, for site preferences.

The invention is based in large part on the low temperature or, alternatively, on the rapidity with which adjustment in magnetization may be made. Accordingly, whereas prior workers have succeeded in producing terminal changes in magnetization only at temperatures of 800° C. in a 6 hour period, equilibration for a sample treated in accordance with the invention is accomplished in a period which does not exceed about 6 hours at a temperature of only 500° C. The increased rate is due to the presence of hydrogen in the atmosphere. While no postulated model has yet been confirmed, it has been demonstrated experimentally that nonreducing atmospheres, such as nitrogen, oxygen, air, etc., do not have this effect.

(3) Processing parameters (a) Atmospheric composition.—It has been indicated that 1 percent by volume of hydrogen serves to bring about the inventive results although a 5 percent minimum is preferred. Increasing hydrogen content to a level of about 15 percent produces acceleration in the effect. For example, a particular composition was equilibrated in a period of about 1 hour for a 15 percent hydrogen atmosphere while a period of about 2 hours was required for 1 percent both at an annealing temperature of 750° C. Increasing hydrogen content even to the extent of 100 percent results in further increase. However, from the standpoint of safety and expediency, an upper list of approximately 15 percent is suggested. This hydrogen level normally present in forming gas represents the highest hydrogen concentration with little danger of explosion. The nature of other atmospheric components is of little concern except that standard precautions must be taken to avoid damage to the garnet material. The requirement, therefore, simply is the presence of available, free hydrogen at the garnet surface.

(b) Temperature.—It has been indicated also that the temperature range is from 500° C. to 800° C. In fact, the lower limit is dictated mainly on the basis of expediency, equilibration being possible at somewhat lower temperature although with longer anneal periods. The uper limit of 800° C. is dependent upon two factors. The ultimate limit concerns the possibility of decomposition of the garnet itself which, depending on composition, may proceed at a measurable rate at temperatures in the order of 800° C. or higher. The second criterion has to do with the growth temperature. Accordingly, the anneal temperature must be sufficiently reduced with respect to the growth temperature to permit a reasonable margin of redistribution. From this standpoint, it is generally desired that the anneal temperature be at least 25° C. below the temperature at which growth was carried out.

Selection of temperature is also dependent on the relationship between the desired ionic population and equilibrium population. If the desired magnetization corresponds with the equilibrium population at a temperature within the presecribed range, the sample simply may be annealed at such temperature without particular attention being given of time of anneal. Under these circumstances, there is no objection to selecting the temperature at the upper end of the range at which the population redistribution proceeds rapidly. If, however, the desired magnetization value does not correspond with equilibrium distribution at a temperature within the range, it may be desired to select a temperature at the low end of the range at which control is practical.

(c) Time.—This parameter, interdependent on the other two, is generally of the order of a few minutes. Samples tested even at the low temperature end of the range have generally been brought to equilibrium over a period of a few hours. The minimum value of 5 minutes indicated is not an absolute limit. In fact, measurable changes may occur, particularly at the high temperature end of the range over an appreciably shorter period.

(4) Garnet composition

The inventive manifestations depend upon a shift in site population for one or more ions partially replacing iron. There has been a considerable amount of work directed to such partial substitutions, and it has been demonstrated that the garnet structure may be retained while partially replacing iron with such diverse elements as Ga, Al, Sc. In, Si, Ge, V, Cr, Zr, Sn, Ru, Mn, Sb. See for example, Experimental Magnetochemistry by M. M. Schieber, North-Holland Publishing Co.—Amsterdam, p. 360 et seq. (1967). Additional partial substitutions have been reported by S. Geller, see Bd/25, Z. Kristallographie, p. 1 (1967).

It will be noted that substitutional ions may be magnetic or nonmagnetic and that they may be of a valence state differing from that of the iron (3+). In the latter instance, valence compensation is required. As also seen in the references cited above, such compensation is accomplished by use of divalent ions such as calcium, bismuth, etc., or, alternatively, by quatravalent ions Si, Ge, etc. The cited references also indicate site references for the various substitutional ions. Many of these references indicate site preferences, and this information may be used as a guide to the expected direction of shift in magnetization resulting from use of the inventive annealing procedure.

For the invention purposes, it is required that partial substitution of iron be at a level of at least 5 cation percent based on the total number of octahedral and tetrahedral sites (in accordance with the usual formula unit resulting in a translation of the minimum of 5 cation percent to 0.25 in such terms). The minimum limit is, of course, premised on the fact that all substitutional ions, while showing a site preference, nevertheless have some equilibrium distribution as between both sites and further that such distribution is temperature dependent. The lower limit set forth is not an absolute limit, but such minimal quantity of substitutional ion is generally required to result in a significant change in magnetic properties on annealing. It is, of course, not required that substitution be by a single ion and, in fact, where the valence state is different from $3^+$, compensation is sometimes conveniently accomplished within the iron sites (although compensation may also result from dodecahedral substitutions).

The upper limit for substitutional ions partially replacing iron is not rigidly fixed. In some cases, the maximum is determined by the number of substitutional ions which may be introduced without destroying the structure. In other cases, the maximum may be determined by the permissible degree of substitution for which spontaneous polarization is retained at a desired operating temperature. In general terms, other circumstances permitting, an absolute maximum for room temperature operation requires the continued presence of at least approximately 3.5 iron ions per formula unit (70 percent population of the iron sites).

A preferred embodiment is premised on the use of the substitutional ions; gallium and aluminum. Both of these ions have a site preference for the tetrahedral site thereby resulting in a decreasing magnetization (generally desired in magnetic devices now contemplated). Both are ordinarily trivalent (eliminating the need for compensating ions) and both are of such size as to permit large substitution without significantly altering the garnet structure.

(5) Examples

The following examples have been selected with a view to facilitating comparison. Accordingly, most have been conducted in a particular atmosphere; some have been conducted at a fixed temperature (with only composition varying); etc. Examples of bulk as well as epitaxial material are included.

Example 1.—An epitaxially grown film of a composition represented by the formula $Er_2EuFe_{4.3}Ga_{0.7}O_{12}$ of a thickness of approximately 5 micrometers on a substrate of the composition $Gd_3Ga_5O_{12}$ and having a magnetization of $4\pi M_s$ of approximately 250 gauss as grown and as measured at room temperature was annealed in forming gas (15 percent $H_2$, 85 percent $N_2$ by volume) at a temperature of 750° C. for successive periods of 15 minutes each. After each anneal period, the sample was permitted to cool and its magnetization value was measured. Such values were 226, 200, 185, and 170 gauss, corresponding with cumulate anneal periods of 15, 30, 60, and 90 minutes.

Example 2.—Example 1 was repeated, however, at a temperature of 700° C. Final magnetization values were 240, 233, 228, and 220 gauss.

Example 3.—A bulk sample of the garnet composition $Eu_2ErGa_{0.7}Fe_{4.3}O_{12}$ in a form of a sphere having a diameter of approximately 90 mils and having a room temperature magnetization, $4\pi M_s$, value of 150 gauss was annealed in forming gas at a temperature of 700° C. for a period of 30 minutes. The final magnetization as measured at room temperature was 80 gauss.

Example 4.—A sample as described in Example 1, again, having an initial magnetization value of approximately 250 gauss, was annealed at an atmosphere consisting of 1 percent hydrogen, remainder nitrogen at a temperature of about 750° C., for a period of about 60 minutes. The final measured magnetization value at room temperature was 225 gauss.

Example 5.—A bulk sample of the composition $Y_{1.8}En_{0.2}Gd_{0.5}Tb_{0.5}Al_{0.6}Fe_{4.4}O_{12}$ of dimensions approximately 2 millimeters by 2 millimeters by 2 mils having a magnetization value as measured at room temperature of 270 gauss was annealed in forming gas at a temperature of 700° C. for a period of 45 minutes. The final magnetization value was 230 gauss.

Example 6.—The procedure of Example 5 was repeated, however, with the composition $Y_2GdAl_{0.8}Fe_{4.2}O_{12}$. The initial and final magnetization values were 210 and 180 gauss.

What is claimed is:

1. Method for altering a magnetic property of an iron-containing composition of the garnet structure, such composition containing at least 5 cation percent of a substitutional ion other than iron in the tetrahedral and octahedral crystallographic sites based on the total number of cations in said sites, said method comprising heating the said garnet composition, characterized in that said heating is conducted in an atmosphere containing at least 1 percent by volume of hydrogen and being carried out over the temperature range of from 500° C. to 800° C., said temperature being at least 25° C. below the growth temperature of the said composition, for a period of at least 5 minutes.

2. Method of claim 1 in which the atmosphere contains at least 10 percent by volume of hydrogen.

3. Method of claim 1 in which the said substitutional ion is nonmagnetic.

4. Method of claim 3 in which the said nonmagnetic ion is selected from the group consisting of gallium and aluminum.

5. Method of claim 1 in which the said composition is that of an epitaxial layer on a substrate.

6. Method of claim 1 in which the said composition is that of a bulk grown crystal.

7. Product produced by the method of claim 1, said product evidencing a ratio of Néel temperature to magnetization different from that of the as grown material.

References Cited

UNITED STATES PATENTS

| | | | |
|---|---|---|---|
| 3,573,099 | 3/1971 | Moore et al. | 117—235 X |
| 3,003,966 | 10/1961 | Van Uitert | 252—62.57 |
| 3,657,131 | 4/1972 | Lagrange et al. | 252—62.57 |
| 3,444,084 | 5/1969 | Geller et al. | 252—62.57 |
| 3,006,856 | 10/1961 | Calhoun et al. | 252—62.57 X |

OTHER REFERENCES

Wood et al.: J.O.A.P. 39, (1968), 1139.
Sawatzky et al.: J.O.A.P. 42, (1971) (January).
Sawatzky et al.: J.O.A.P. 42, (1971) (January) 367.

WILLIAM D. MARTIN, Primary Examiner
B. D. PIANALTO, Assistant Examiner

U.S. Cl. X.R.

117—235; 148—121; 252—62.57, 62.58

UNITED STATES PATENT OFFICE
CERTIFICATE OF CORRECTION

Patent No. 3,759,745 Dated September 18, 1973

Inventor(s) Melvyn Dixon and Arieh J. Kurtzig

It is certified that error appears in the above-identified patent and that said Letters Patent are hereby corrected as shown below:

Column 3, line 32, "(not hsown)" should read --(not shown)--;

line 35, "information loops," should read --"information loop "--;

line 50, "consucetive" should read --consecutive--;

line 60, "reresented" should read --represented--.

Column 4, line 32, "oevrlay" should read --overlay--.

Column 8, line 57, "$Y_{1.8}En_{0.2}Gd_{0.5}Tb_{0.5}Al_{0.6}Fe_{4.4}O_{12}$" should read --$Y_{1.8}Eu_{0.2}Gd_{0.5}Tb_{0.5}Al_{0.6}Fe_{4.4}O_{12}$--.

Signed and sealed this 14th day of May 1974.

(SEAL)
Attest:

EDWARD M. FLETCHER, JR.
Attesting Officer

C. MARSHALL DANN
Commissioner of Patents